(12) United States Patent
Hill (10) Patent No.: US 10,962,261 B1
(45) Date of Patent: Mar. 30, 2021

(54) EARTH COUPLED HEAT EXCHANGER FOR A GEOTHERMAL HEAT PUMP

(71) Applicant: Charles E. Hill, Karnack, TX (US)

(72) Inventor: Charles E. Hill, Karnack, TX (US)

(*) Notice: Subject to any disclaimer, the term of this patent is extended or adjusted under 35 U.S.C. 154(b) by 1813 days.

(21) Appl. No.: 13/887,677

(22) Filed: May 6, 2013

Related U.S. Application Data (63) Continuation of application No. 11/900,183, filed on Sep. 10, 2007, now abandoned.

(60) Provisional application No. 60/843,452, filed on Sep. 8, 2006.

(51) Int. Cl.
  *F24T 10/00* (2018.01)
(52) U.S. Cl.
  CPC .................................. *F24T 10/00* (2018.05)
(58) Field of Classification Search
  CPC .... F25B 2313/002; F25B 30/06; Y02E 10/18; Y02E 10/125; Y02E 10/16; Y02E 10/12; F24J 3/08
  USPC ...................................... 165/45, 287; 62/260
  See application file for complete search history.

(56) References Cited

U.S. PATENT DOCUMENTS

| | | |
|---|---|---|
| 2,145,473 A | 1/1939 | Billner |
| 3,183,675 A | 5/1965 | Schroeder |
| 3,741,480 A | 6/1973 | Van Huisen |
| 3,952,802 A | 4/1976 | Terry |
| 4,224,805 A | 9/1980 | Rothwell |
| 4,257,395 A * | 3/1981 | Wieder ................... F24J 2/402 126/587 |
| 4,290,266 A | 9/1981 | Twite et al. |
| 4,325,228 A | 4/1982 | Wolf |
| 4,375,831 A * | 3/1983 | Downing, Jr. ...... F24D 11/0214 165/45 |
| 4,489,568 A * | 12/1984 | Shapess .................. F16L 55/02 165/45 |
| 4,566,532 A | 1/1986 | Basmajian |
| 4,606,319 A * | 8/1986 | Silva ..................... F02M 31/18 123/525 |
| 4,831,843 A | 5/1989 | Cochran |
| (Continued) | | |

OTHER PUBLICATIONS

"Ground Loop Configuration and Installation", from: http://www.geo4va.vt.edu/A2/A2.htm, 27 pages date unknown.

*Primary Examiner* — Tho V Duong
*Assistant Examiner* — Raheena R Malik
(74) *Attorney, Agent, or Firm* — Faegre Drinker Biddle & Reath LLP (57) ABSTRACT

A geothermal system transfers heat between the earth and a target. The system includes a containment vessel having an interior volume and a valve being selectively opened and closed to supply a first fluid to the interior volume of the containment vessel so that heat is transferred between the earth and the first fluid. An interior heat exchange line is located in the interior volume of the containment vessel. A second fluid is located in the heat exchange line to transfer heat between the first fluid and the target. A pump for circulates the second fluid through the interior heat exchange line. The system also includes a low temperature activated switch configured to open the valve in response to a temperature of the first fluid in the interior volume of the containment vessel dropping below a preset temperature, and a high temperature activated switch configured to open the valve in response to the temperature of the first fluid in the interior volume of the containment vessel rising above a preset maximum value.

8 Claims, 7 Drawing Sheets

(56) References Cited

U.S. PATENT DOCUMENTS

| | | | |
|---|---|---|---|
| 4,858,679 A | | 8/1989 | Sakaya et al. |
| 4,993,483 A | | 2/1991 | Harris |
| 5,383,337 A | | 1/1995 | Baker |
| 5,477,914 A | | 12/1995 | Rawlings |
| 5,553,459 A | * | 9/1996 | Harrison .................. E03B 3/28 62/271 |
| 5,560,220 A | | 10/1996 | Cochran |
| 5,561,985 A | | 10/1996 | Cochran |
| 5,590,715 A | | 1/1997 | Amerman |
| 5,687,578 A | | 11/1997 | Cochran |
| 5,771,700 A | | 6/1998 | Cochran |
| 5,816,314 A | | 10/1998 | Wiggs et al. |
| 6,138,744 A | | 10/2000 | Coffee |
| 6,142,215 A | | 11/2000 | Paulsen et al. |
| 6,615,601 B1 | | 9/2003 | Wiggs |
| 7,841,200 B1 | | 11/2010 | Wiggs |
| 2002/0084227 A1 | * | 7/2002 | Sower ..................... C02F 11/20 210/739 |
| 2004/0159110 A1 | | 8/2004 | Janssen |
| 2005/0183428 A1 | * | 8/2005 | Gruber ..................... A01J 9/04 62/99 |
| 2010/0326623 A1 | | 12/2010 | Azzam |
| 2011/0036112 A1 | | 2/2011 | Livingston et al. |

* cited by examiner

EARTH COUPLED HEAT EXCHANGER FOR A GEOTHERMAL HEAT PUMP

This application is a continuation of U.S. application Ser. No. 11/900,183, filed Sep. 10, 2007, which claims the benefit of U.S. Provisional Application Ser. No. 60/843,452, filed Sep. 8, 2006, the disclosures of which are expressly incorporated by reference herein.

BACKGROUND AND SUMMARY

The present invention relates to the field of heating and/or cooling, and, more particularly, to an apparatus and method for transferring heat between a fluid and the earth.

Geothermal heat pump systems are well known. These systems utilize the earth or a body of water as a means of extracting heat in a heating mode or dumping heat in a cooling mode. Systems are generally classified as open loop, closed loop, or direct exchange systems.

An open loop system pumps water from a well or other water source, uses it within a water-refrigerant heat exchanger located in the heat pump, and then dumps it either into an existing stream, body of water, surface water drainage system, or another well to the underground water source. In conventional open loop systems, the water passing through the water-refrigerant heat exchanger can become contaminated if there is a leak in the exchanger. Discharging this water either into a well or as ground water could contaminate the underground water source.

A closed loop system uses water, a water-antifreeze solution, or other liquid which is circulated through a liquid-refrigerant heat exchanger located in the heat pump system and then through pipes or tubing either buried vertically or horizontally in the earth or a surface body of water. Polymeric pipes or tubing are sometimes used to minimize corrosion where they contact the earth and/or the surface body of water. Contamination of the earth and/or the surface body of water may occur if there is a leak in the water-refrigerant heat exchanger. There is no means of containing a contaminate leak in conventional closed loop systems. Polymeric pipes or tubing have a very high resistance to heat transfer and therefore their use in an earth-liquid heat exchanger is very inefficient. Therefore, extensive lengths of piping or tubing must be used which typically increases the cost of the project.

A direct exchange ("DX") system eliminates the water-refrigerant heat exchanger at the heat pump by extending the refrigerant piping out of the heat pump and into the earth or surface water source to enable heat transfer between the refrigerant and the earth. As with the open and closed loop systems, DX systems can contaminate the earth if the refrigerant leaks through the piping.

An illustrated embodiment of the present invention comprises a geothermal system for transferring heat to and from a target. The target may be any conventional system utilizing a fluid to exchange heat. For example, the target can be the air side of an air/fluid heat exchanger as may be found in a conventional geothermal heat pump. In one embodiment, a geothermal heat exchanger includes a containment vessel having an interior volume defined by a wall, a near end, and a far end. The containment vessel illustratively has a cap at the near end and a plug at the far end. The cap and the plug seal the interior volume. The containment vessel is filled with a first fluid. Heat is transferred between the earth and the first fluid located in the containment vessel.

An illustrated embodiment of the present geothermal heat exchanger has an interior heat exchange line filled with a second fluid. The interior heat exchange line is located in the interior volume of the containment vessel and is configured to transfer heat between the first fluid and the second fluid. The interior heat exchange line illustratively has an input line and a return line. The input line is in fluid communication with the return line. Both lines exit the interior volume through orifices formed in the containment vessel. Illustratively, the lines exit the interior volume through orifices formed in the cap. In an illustrated embodiment, the interior heat exchange line is made of copper and the first fluid is water that is naturally or chemically treated to have a acidic level compatible with copper and with minimal contaminants to minimize corrosion and scaling of the copper lines. The interior heat exchange line is in fluid communication with a conventional exterior heat exchange line located illustratively outside the containment vessel and configured to transfer heat between the second fluid and a target.

In another illustrated embodiment, the system includes at least one metallic support fin for separating the input line and the return line. The support fin(s) is (are) designed to permit the first fluid to circulate around it (them) or through it (them). In one embodiment, the liquid and return lines pass through orifices formed in a support fin. In another embodiment, the liquid and return lines are inserted into slots having open-ends which are located on a periphery of a support fin. In another embodiment, a support fin has additional orifices to facilitate circulation of the first fluid within the containment vessel.

While it is feasible to insert the containment vessel into the ground with an installed cap, it is also economical to simply plug or seal the containment vessel after installation. The water that is in the containment vessel after installation and plugging, is simply pumped out and replaced with the first fluid. In one illustrated embodiment, the geothermal heat exchanger includes an inlet line for filling the containment vessel with the first fluid and an outlet line for determining the fill condition. These lines can also be used to route the first fluid to/from an external supplemental heater/chiller as discussed below.

The present system works by drawing heat from the earth and transferring it to the target during the heating cycle, or by drawing heat from the target and transferring it to the earth during the cooling cycle. The system's heat transfer coefficient is determined by the interior volume of the containment vessel, material choices and pipe diameters. In many locations, a system according to the aforementioned embodiments can reasonably be built that will satisfy the heating and cooling needs of the target. In other locations, however, a geothermal heat exchanger built according to the aforementioned embodiments will satisfy the heating and cooling needs of the target most of the time, but may not satisfy the target's needs during peak heating or cooling periods.

According to another illustrated embodiment, the system described above may also include a supplemental heat exchanger that operates during peak heating or cooling periods. Most of the time, the supplemental heat exchanger is idle. The supplemental heat exchanger has a controller and, optionally, a temperature sensor which is located in the interior volume of the containment vessel. The controller is programmed to cause the first fluid to be circulated through a supplemental heater/chiller whenever the first fluid temperature exceeds a predetermined minimum/maximum temperature. Another option that is very economical is to modify the normal on/off cycle of the geothermal system so that the geothermal system is locked out whenever the first fluid temperature exceeds a predetermined minimum/maximum temperature. This will allow the normal heat transfer from the earth to the first fluid to raise/lower the first fluid temperature back to an acceptable level.

In another illustrated embodiment, the first fluid is circulated through an external heat exchanger. A controller and temperature sensor(s) in the containment vessel cause the first fluid in the containment vessel to be circulated through the external heat exchanger whenever the first fluid temperature exceeds a predetermined minimum/maximum temperature.

In yet another illustrated embodiment, a portion of the first fluid is replaced with conditioned fluid whenever the temperature of the first fluid exceeds a pre-determined high or low temperature value. The replaced first fluid is discharged to any acceptable storm water drainage area in an illustrated embodiment as discussed below.

In a further illustrated embodiment, a quantity of auxiliary first fluid is stored in a near-surface storage tank to be used to replace a portion of the first fluid in the containment vessel. The replaced first fluid is illustratively returned to the auxiliary first fluid storage tank. A controller and temperature sensor(s) in the containment vessel cause the supplemental first fluid in the auxiliary storage tank to replace a portion of the first fluid in the containment vessel as discussed below.

In a still further illustrated embodiment, a quantity of auxiliary first fluid is stored in a near-surface storage tank to be used to replace a portion of the first fluid in the containment vessel after first being circulated through a supplemental heat exchanger (heater and/or chiller). The replaced first fluid is returned to the auxiliary first fluid storage tank. A controller and temperature sensor(s) in the containment vessel cause the supplemental first fluid in the auxiliary storage tank to replace a portion of the first fluid in the containment tank as discussed in detail below.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The above-mentioned and other features of this invention, and the manner of attaining them, will become more apparent and the invention itself will be better understood by reference to the following description of illustrated embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DETAILED DESCRIPTION OF THE DRAWINGS

The present invention will now be described more fully hereinafter with references to the accompanying drawings, in which illustrated embodiments of the invention are shown. The embodiments discussed below are not intended to be exhaustive or limit the invention to the precise forms disclosed in the following detailed description. Rather, the embodiments are chosen and described so that others skilled in the art may utilize their teachings.

Figure 1:
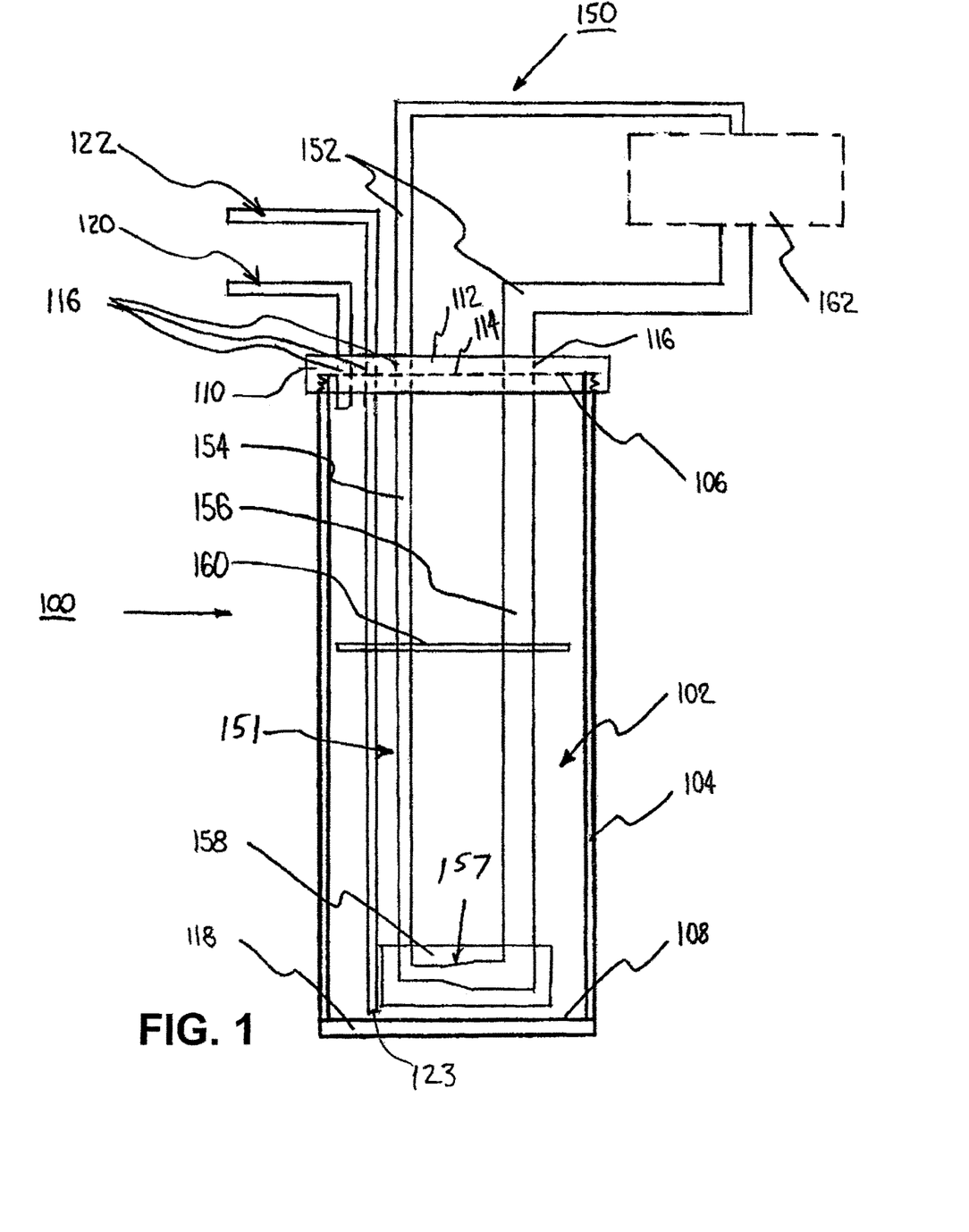
FIG. 1 is a diagrammatical representation, partially in section, of an illustrated embodiment of the invention showing a containment vessel, a heat exchange line comprising an interior and an exterior line, a support fin, a heat pump, an inlet line, and an outlet line.

Referring initially to FIG. 1, illustrated embodiments of the geothermal heat exchanger and its operation in accordance with the present invention are described. In one embodiment, the geothermal heat exchanger includes a casing or containment vessel 100 having an interior volume 102 defined by a wall 104, a near end 106, and a far end 108. The containment vessel 100 has a cap 110 at the near end 106 and a plug 118 at the far end 108. The cap 110 has an inner surface 114 and an outer surface 112. The cap 110 reduces the likelihood that contaminants will enter the interior volume 102 of containment vessel 100. Sealing of the far end 108 with a plug 118 is described in more detail with reference to FIG. 5 below. The containment vessel 100 is buried in the earth. The interior volume 102 is filled with a first fluid. Heat is transferred between the earth surrounding the containment vessel 100 and the first fluid located in the interior volume 102.

The geothermal heat exchanger has an interior heat exchange line 151 filled with a second fluid. The interior heat exchange line 151 is located in the interior volume 102 and is configured to transfer heat between the first fluid and the second fluid. The interior heat exchange line 151 illustratively has an input line 154 and a return line 156. The input line 154 is in fluid communication with the return line 156. Fluid communication is achieved by connecting the input and return lines 154, 156 to a U-shaped tube 157. A stub cap 158 may be placed around the U-shaped tube 157 to protect it. Preferably, the lines exit the interior volume 102 through orifices 116 formed in the cap 110. However, the lines may also exit the interior volume 102 through orifices formed in the wall 104 of the containment vessel 100. In an illustrated embodiment, the interior heat exchange line is made of copper and the first fluid is water that is naturally chemically inert or is chemically treated to substantially eliminate or minimize corrosion. Chemical treatment includes neutralizing the acidic content and may involve adding biocides to end microbiological life. Such chemical treatment increases the useful life of the system.

The interior heat exchange line 151 is in fluid communication with a conventional exterior heat exchange line 150 located outside the containment vessel 100 and configured for transferring heat between the second fluid and a target 162. The target 162 can be any conventional system utilizing a fluid to exchange heat. For example, the target may illustratively be the air side of an air/fluid heat exchanger as may be found in a conventional geothermal heat pump.

In another illustrated embodiment, the system includes at least one support fin 160 for separating the input line 154 and the return line 156. The support fin 160 is designed to permit the first fluid to circulate around it or through it. Support fins 160 are described in more detail with reference to FIGS. 3 and 4 below.

While it is feasible to fill or empty the containment vessel 100 by removing the cap 110, it is advantageous to do so leaving the cap 110 in place. FIG. 1 shows a geothermal heat exchanger having an inlet line 120 for filling the containment vessel 100 with first fluid and an outlet line 122 for removing first fluid from the containment vessel 100. The inlet line 120 has a first end located outside the containment vessel 100 and a second end located in the interior volume 102. The first end is removably connected to a source of first fluid. The outlet line 122 has a first end located outside the containment vessel 100 and a second end 123 located in the interior volume 102. The second end 123 of outlet line 122 is illustratively located adjacent the far end 108 of containment vessel 100 to facilitate removal of the first fluid from the interior volume 102. In one illustrated embodiment, the first end of outlet line is removably connected to a first fluid reservoir. In another embodiment, a single line may be used to both fill and drain the first fluid from the interior volume 102 of the containment vessel 100.

Should there be a refrigerant leak that would cause the first fluid to be contaminated, the sealed containment vessel contains any released contaminates in the interior volume 102. In the event of such contamination, the assembly comprising first fluid inlet/outlet lines 120/122, refrigerant lines 154/156, coupler/stub cap 157/158 and containment vessel is removed. The first fluid is then pumped from the containment vessel and the containment vessel is flushed to any existing local, state, or federal requirements. The containment vessel is then refilled with first fluid. The integrity of the containment vessel seal may be tested by slightly pressuring the first fluid and monitoring for any losses. The original assembly, if testing proves the integrity of the assembly, or a new assembly is then installed.

The system works by transferring heat from the first fluid to the second fluid during the heating cycle, or transferring heat from the second fluid to the first fluid during the cooling cycle. The system's heat transfer rate is determined, in part, by the interior volume 102 of the containment vessel 100, by the surface area of the containment vessel 100 in contact with the earth, by the diameters and lengths of refrigerant pipes 152, and by material choices.

In cold climates, it is advisable to bury the containment vessel 100 such that the cap 110 is at least as deep as the frost level in order to prevent freezing of the first fluid. In warm climates, where freezing is of no concern, the containment vessel 100 may actually extend above ground level to facilitate maintenance. The containment vessel and all piping may be insulated to minimize the effects of ambient temperature.

The internal volume 102 of the containment vessel 100 is designed to satisfy the desired heat exchange demand of the target 162. As will be explained below, where a system includes a supplemental heat exchanger 200, the geothermal heat exchanger may be designed to meet the target's 162 demand a majority of the time, to optimize total system cost, while relying on the supplemental heat exchanger 200 or lockout mechanism to satisfy peak period demand.

The design criteria for a 4 ton geothermal heat exchanger will be described for illustration. A prior art 4 ton geothermal system comprising a refrigerant-water heat exchanger was used to calculate the energy transfer capacity requirements. The system circulated 11 gallons-per-minute (gpm) of well water through the heat exchanger. One ton of air conditioning (one ton geothermal) capacity is equivalent to 12,000 BTU/hour. Therefore a four ton geothermal (four ton air conditioner) will provide 48,000 BTU/hour. The outside ambient temperature was near 0° F. The ON cycle time was measured to be 10 minutes. Therefore the unit provided 10/60×48,000=8000 BTU's during that 10 minute ON cycle. The advertised efficiency of the prior art unit suggested it would have used approximately 3000 BTU's of electrical energy to operate the compressor. The remaining 5000 BTU's would have been extracted from the well water. During the 10 minute ON cycle, 110 gallons of well water would have been circulated through the water-refrigerant heat exchanger. The specific heat capacity of water at 55° F. is 5.51 BTU/LB ° F. Assuming a 10° F. temperature change, 110 gallons of water represents approximately 50,000 BTU's. Therefore, the temperature of the water flowing through the water-refrigerant heat exchanger would have dropped (heating cycle) approximately 1° F. to extract 5,000 BTU's.

To match the performance of the prior art system described, the geothermal heat exchanger would need to transfer 5,000 BTU's from the first fluid to the second fluid during the 10 minute ON cycle. As an initial starting point for the design, it would be reasonable to having a containment vessel diameter and length that would contain 110 gallons of the first fluid. It would also be reasonable to have refrigerant tubes within the containment vessel to be of equal or greater length than the refrigerant tubes within a prior art geothermal water-refrigerant heat exchanger. If a 6.0 inch internal diameter steel containment vessel 100 is used, having a 0.25 inch wall 104 thickness, then the total length of the containment vessel 100 would be approximately 70 feet to accommodate the 110 gallons of water.

The next design step is to determine if the water within the containment vessel 100 will recover from the projected 10° F. drop during the cycle. The outside circumference of a containment vessel 100 is $\pi D$, where D is the outer diameter of the containment vessel 100. In this case, the outside circumference is 6.5π inches.

The outside diameters of the liquid and return copper lines are typically ⅜ inches and ⅝ inches, respectively. The ratio of steel containment vessel 100 surface to copper refrigerant surface is therefore 6.5/(3/8+5/8)=6.5/1=6.5.

In the prior art system there is no recovery time because each time the system turns on new water is drawn from the well. In the proposed system, recovery time becomes a factor because the system uses a static amount of first fluid. During the ON-cycle, a number BTU's are transferred from the second fluid to the first fluid across copper tubing. Copper has a thermal conductivity of 401. The same number of BTU's must now be transferred from the first fluid to the earth across the steel containment vessel. Steel has a thermal conductivity of 46. Therefore the conductivity ratio of copper to steel is 8.7. As calculated previously, the ratio of steel containment vessel 100 surface to copper refrigerant line 151 is 6.5. The time it takes for the first fluid to recover is dependent on the ratio of (copper-steel thermal ratio)/(steel containment vessel surface-copper tubing surface) which is 8.7/6.5=1.34. Therefore, the ratio of OFF/ON cycle time should be at least 1.34 to allow first fluid to recover. However, it should be noted that for any geographic area, tests are required to determine the recovery time more accurately. The earth to first fluid heat transfer rate cannot be accurately calculated without such tests since there are several unknowns such as moisture content of the earth, composition of the earth, and contact between the earth and the steel containment vessel.

In many locations, a system according to the aforementioned embodiments can reasonably be built that will satisfy the heating and cooling demand of the target 162. In other locations, however, a geothermal heat exchanger built according to the aforementioned embodiments will satisfy the heating and cooling needs of the target 162 most of the time, but it will not satisfy the target's 162 needs during peak heating or cooling periods.

Figure 2:
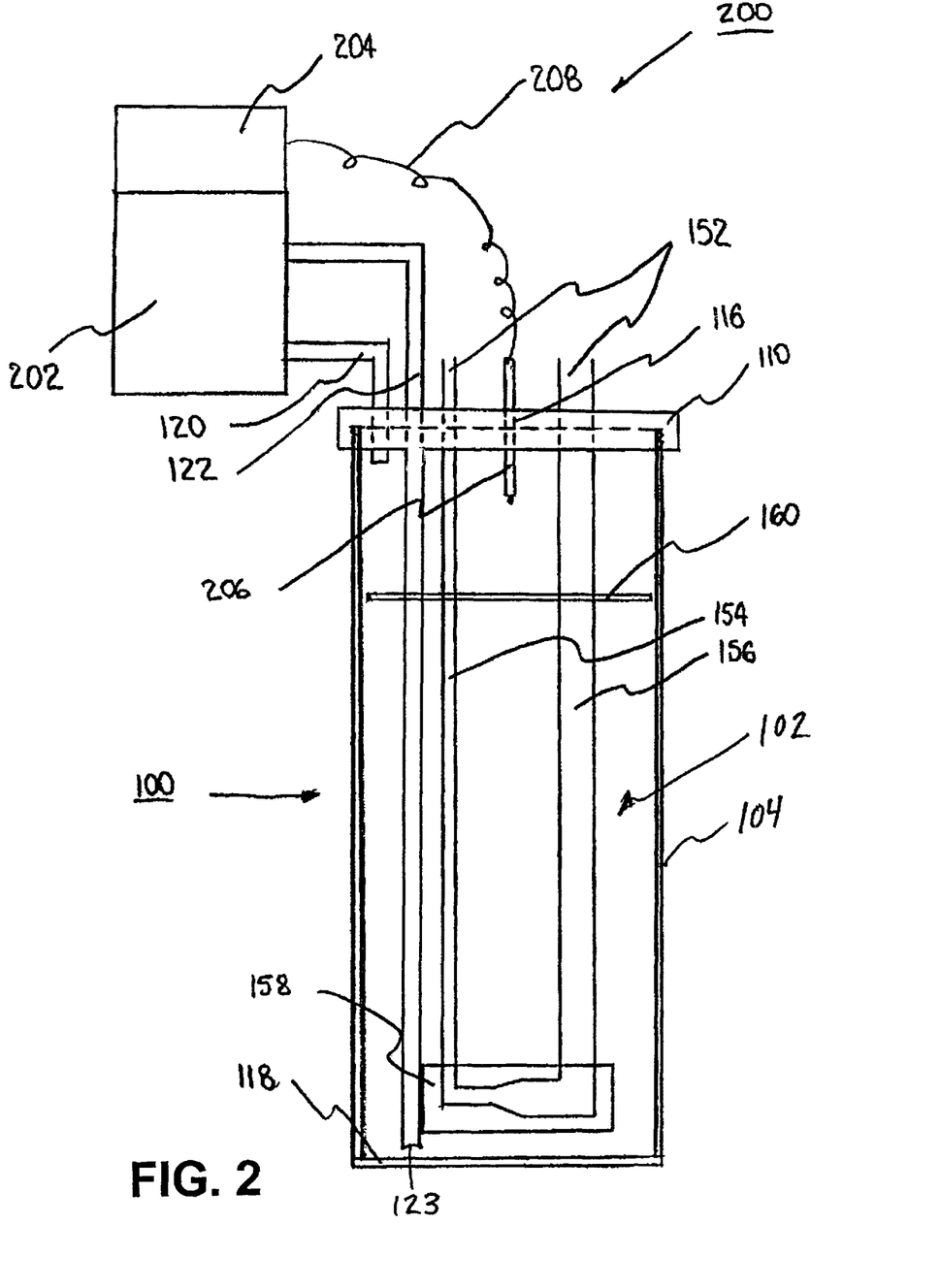
FIG. 2 is a diagrammatical representation, partially in section, of another illustrated embodiment of the invention showing a containment vessel, the interior line of a heat exchange line, a support fin, an inlet line, an outlet line, and a supplemental heat exchange system having a heat exchanger, a controller, a temperature sensor, and a wire connecting the temperature sensor and the controller.

Referring now to FIG. 2, another embodiment of the geothermal heat exchanger system and its operation in accordance with the present invention is illustrated. According to this embodiment, the system described above also includes a supplemental heat exchanger 200 that operates during peak heating or cooling periods. The supplemental heat exchanger 200 has an energy transfer system 202, supply and return lines (not shown), a controller 204 and, optionally, a temperature sensor 206. The supply line is connected to the inlet line 120 and the return line is connected to the outlet line 122. The temperature sensor 206 is located in the interior volume 102 and is shown physically connected by a wire 208 to the controller 204. However, depending on the type of sensor used, the sensor may also include a signal converter or a wireless signal transmitter, and the controller 204 may also include a receiver to receive the temperature signal emitted by the wireless transmitter. Most of the time, the supplemental heat exchanger 200 is idle, meaning that the controller 204 monitors the first fluid temperature as detected by the temperature sensor 206 but without operating the energy transfer system 202.

The system has normal and supplemental modes of operation. When the geothermal heat exchanger can satisfy the target's demand without the first fluid in the containment vessel 100 exceeding the high or low temperature limits, the system operates in the normal mode. When demand exceeds the ability of the geothermal heat exchanger to meet demand, the system enters supplemental mode. In supplemental mode, the energy transfer system 202 adds or removes heat to or from the first fluid to enable the geothermal heat exchanger to satisfy the demand from the target 162.

In another illustrated embodiment, the energy transfer system 202 comprises a closed system such as a refrigerant/liquid system from the prior art. In the cooling cycle, the energy transfer system 202 may be a chiller. In the heating cycle, the energy transfer system 202 may utilize a heater to heat the first fluid. Whether the energy transfer system 202 includes heating or cooling or both will depend on the system requirements which, at least in part, will be determined by the geographical location where the system operates. In some cold climates where summer temperatures are not very high, the energy transfer system 202 may only have to provide heat. In other climates, where winters are not very cold and summers are very hot, the system may only have to provide cooling.

The target 162 will generally operate in cooperation with a thermostat that measures temperatures and is configured to control the target 162. In a heat pump installed in a home, for example, the thermostat is programmed with a set point temperature, measures ambient temperature, and operates the air/liquid heat exchanger to maintain ambient temperature at the set point temperature.

The controller 204 monitors the temperature of the first fluid. Should the temperature of the first fluid 102 exceed preset high/low limits, controller 204 in electronic communication with the thermostat causes a thermostat control signal to the geothermal heat pump to be interrupted effectively lengthening the OFF cycle. Once the temperature of the first fluid has recovered sufficiently, the geothermal heat pump lock out is removed and it returns to the ON cycle. The ambient air within the enclosure, such as a home or office, would tend to drift further and further away from its preset level until outside ambient conditions have come back to expected normalcy. In the interim, the occupants might incur some discomfort and have to adjust to temperature levels a few degrees warmer or colder than the optimum desired temperature. The effect is the same as suggested by the government and power companies, "Turn your thermostat down in the winter and up in the summer from your normal comfort zone to conserve energy".

Figure 3:
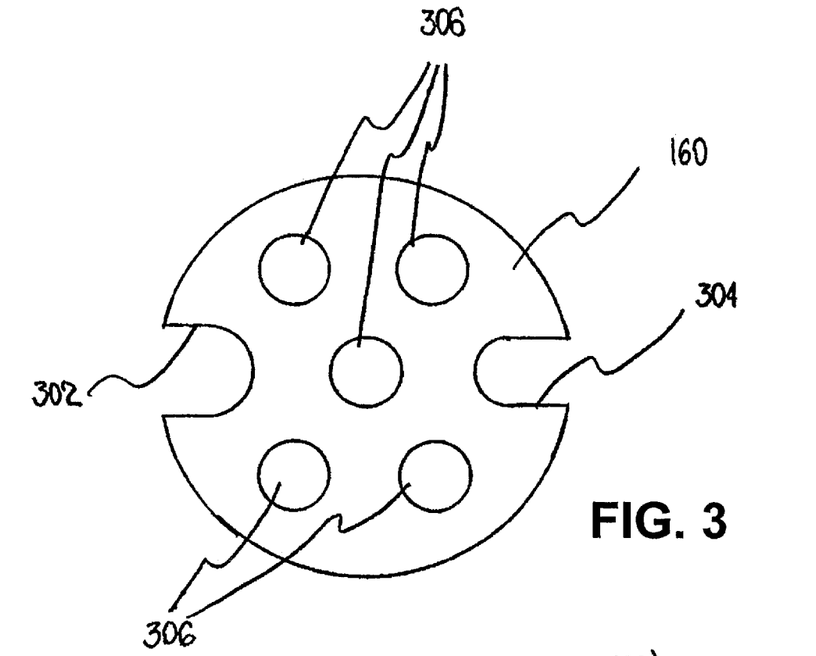
FIG. 3 is a top view of a support fin having two slots and a plurality of circular orifices.
Figure 4:
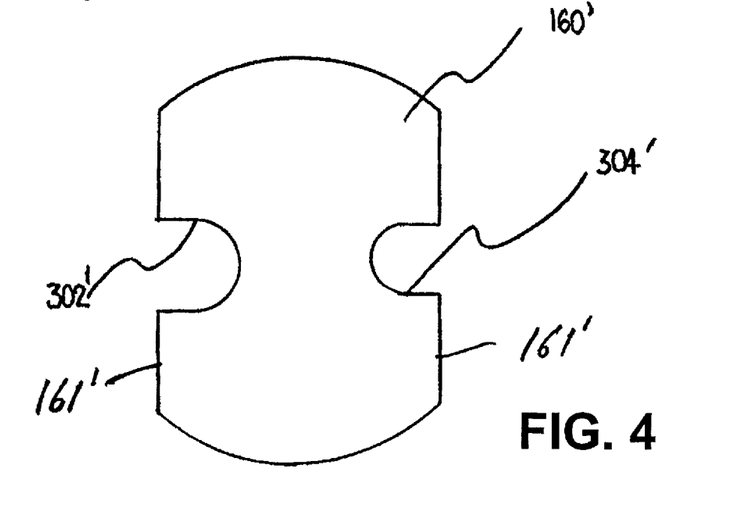
FIG. 4 is a top view of a support fin having two slots.

Referring now to FIGS. 3 and 4, an illustrated embodiment of the geothermal heat exchanger comprises at least one support fin 160. The support fin 160 stabilizes the separation between the input line 154 and the return line 156 to enhance heat transfer between the liquid in the input and return lines 154, 156 and the first fluid. The support fin 160 may be made of a thermally conductive material to increase the heat transfer rate of the system. Depending on the demand requirements, location, cost, and other factors, support fins 160 may be designed to maximize stability, or heat transfer, and/or to reduce cost.

In one embodiment, the support fin 160 shown in FIG. 3 has an input line orifice and a return line orifice configured to receive the input and return lines 154, 156, respectively. The support fin 160 is configured to fit inside the containment vessel 100. Additionally, the support fin 160 may have a plurality of flow orifices to increase circulation of the first fluid inside the containment vessel 100 in convection currents.

FIG. 3 exemplifies an illustrated embodiment of a support fin 160. In this embodiment, the support fin 160 has a generally circular shape and is designed to fit inside a cylindrical containment vessel 100. The return and input line orifices 302, 304 illustratively have slot shapes with the opening of the slot positioned on the circumference of the support fin 160. The width of each slot is defined as the distance separating its two straight surfaces. Its length is the distance measured along an imaginary line parallel and equidistant between the two straight surfaces that starts at the open end of the slot and ends when the imaginary line intersects the semi-circular closed end. In another embodiment, the return and input line orifices 302, 304 have semi-circular shapes.

The return line orifice 302 and the input line orifice 304 are configured to receive the liquid and return lines 154, 156, respectively. The diameter of the circular support fin 160 is sufficiently smaller than the diameter of the containment vessel 100 to enable the support fin 160 to slide into the containment vessel 100 as the interior heat exchange line is inserted into the containment vessel 100.

In an illustrated embodiment, the support fin 160 shown in FIG. 3 is made of copper and is soldered to a copper input line 154 and a copper return line 156 to increase heat transfer rate. The space between the periphery of the support fin 160 and the inner wall 104 of the containment vessel 100 and a plurality of flow orifices 306 allow convection currents to flow vertically in the containment vessel 100.

FIG. 4 exemplifies another embodiment of a support fin 160'. This support fin 160' has a return line orifice 302' and an input line orifice 304'. The first fluid may circulate by the straight edges 161' of the support fin 160'. Flow orifices similar to orifices 306 in FIG. 3, may be added to fin 160', if desired, to increase flow.

For structural integrity, support fins 160 or 161' may be spaced at least every 15 feet, preferably every 10 feet, and even more preferably every 7 feet apart. Depending on the design of the support fin 160 or 160', closer or wider spacing may be desirable to increase heat transfer rate. Some designs increase heat transfer between the copper piping and the support fin 160, while other designs may improve convective flow. Whether convective flow requires improvement also depends on the size of the support fin 160 or 160' relative to the size of the containment vessel 100.

The containment vessel 100 is illustratively made of a tube which is sealed at both ends. In one embodiment, the containment vessel 100 is a steel tube. The tube profile may be circular, square, or of any other shape. Alternatively, the containment vessel 100 can be made of any thermally conductive material that can be inserted or driven into a borehole. The near end 106 is sealed with a cap 110. A removable cap 110 facilitates inspection and maintenance of the geothermal heat exchanger. A gasket seal made from any material known in the art, such as silicone or rubber for example, may be interposed between the near end 106 of the tube and the inner surface 114 of the cap 110 to improve the seal. Furthermore, the cap 110 may be machined to provide seals for each end of the interior heat exchanger line and, optionally, for the first fluid inlet and outlet lines 120, 122 and the temperature sensor 206. The interior heat exchange line 151 and the temperature sensor 206 are thermally and electrically insulated from the cap 110. In an illustrated embodiment, the cap on top of the containment vessel is not screwed on. This would prevent the maintenance of any of the assemblies without disconnecting all of the lines going through the cap. Each line, in a preferred embodiment will have a disconnect above and below the cap. This will facilitate removal of one or more of the tubes and temperature probes without removing all of the devices.

The far end 108 of the tube may be sealed in a variety of ways. FIGS. 1 and 2 show one embodiment of the invention in which the far end 108 of the tube is sealed by attaching a plug 118 to the end of the tube. The plug 118 may be attached permanently such as by welding, or the plug 118 may be removably attached by threading the tube and the plug 118 and then screwing the plug 118 onto the tube. While the plug 118 is shown as a flat plate, the tube may be designed to facilitate penetration of the tube into the borehole. For example, the plug 118 may have a conical shape on its external surface.

Figure 5:
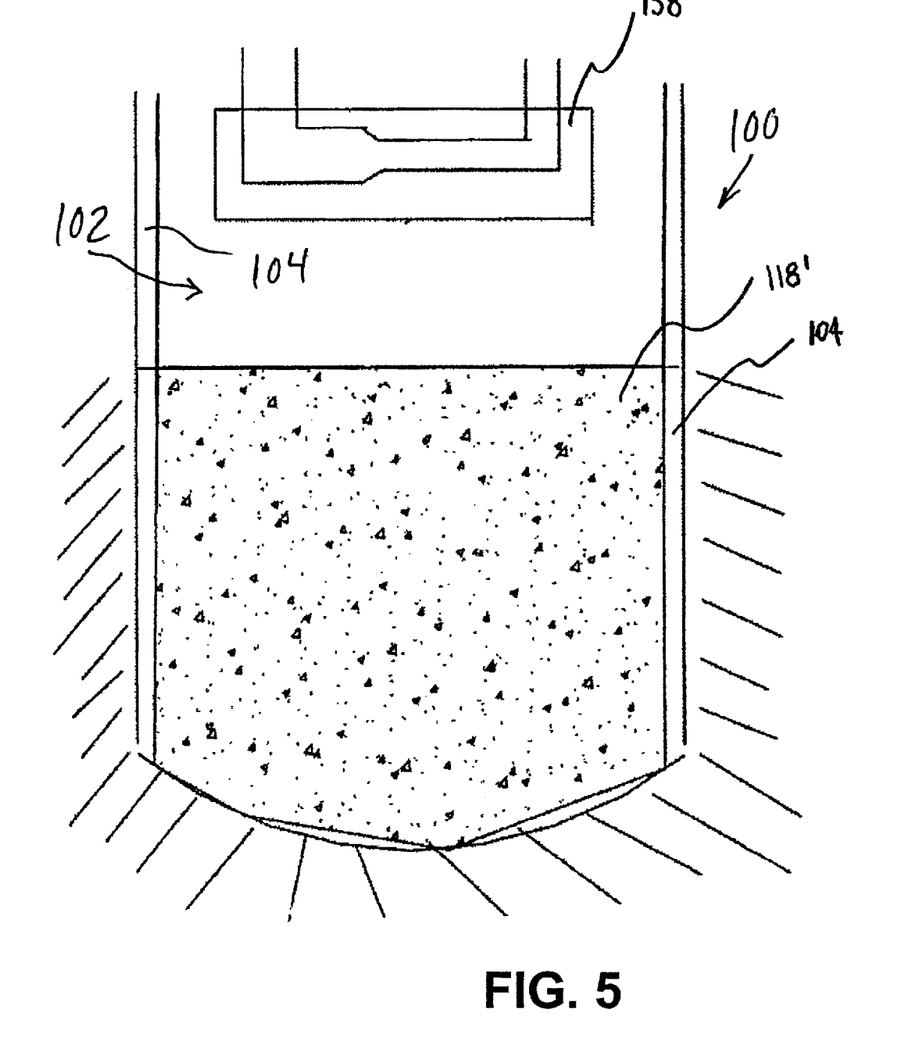
FIG. 5 is a diagrammatical representation, partially in section, of another embodiment of the invention showing a far end of a containment vessel and a plug comprising concrete, clay or other acceptable medium for sealing the containment vessel.

In another embodiment, the far end 108 of the tube is sealed by filling the far end 108 of the tube with fill material. FIG. 5 shows a plug 118' consisting of fill material. The fill material can be any material that can prevent or minimize the first fluid from escaping the sealed containment vessel 100. By way of non-limiting example, the fill material can be concrete, compacted clay, or any fill material known in the art.

The containment vessel 100 is buried into the ground. In one method of burying the containment vessel 100, the containment vessel 100 is driven into the ground. A borehole smaller than the internal diameter of the tube is made by impacting a tool into the earth. The containment vessel 100 is then forced down the borehole following the advance of the impact tool. Alternatively, a borehole drill can be used to make a borehole. Borehole drills may use a rotary drill, a percussion drill, or a combination of both.

In another method, a borehole is drilled which has a diameter larger than the external diameter of the containment vessel 100. Upon reaching the desired depth, the drilling tool is removed and the containment vessel 100 is lowered into the borehole. The space between the outer surface of the containment vessel 100 and the inner surface of the borehole is filled with pea gravel to a level which is twenty feet below grade. The remaining area is then filled with bentonite clay, for example, or other suitable material to seal the subsurface water table from groundwater to prevent contamination.

As discussed above, the sealed containment vessel 100 of the present invention holds the first fluid and the heat exchange line 151. Therefore, if a leak occurs in the heat exchange line 151 causing contamination of the first fluid, the internal volume 102 of the containment vessel 100 can be drained and flushed to remove the first fluid and the contaminants without the contaminants reaching the surrounding soil. The heat exchange line 151 may then be removed from the containment vessel 100 and repaired or replaced. New refrigerant is then added to the heat exchange line 151 and the internal volume 102 of containment vessel 100 is refilled with the first fluid.

In the illustrated embodiment, the first fluid within the containment vessel 100 is water. The level of water within the internal volume 102 of containment vessel 100 may be controlled using a fluid supply and level sensor. The level of the first fluid can be controlled to any desired level to optimize performance.

In the illustrated embodiment, the first fluid is water having a chemical composition that is controlled to reduce the risk that the copper refrigerant lines will fail. Acidic and/or sulphur compounds in the water or earth tend to cause copper to degrade. In most cases, drinking water, whether from a municipal source or from a well which has been run through a home water conditioner will be adequate for use as the first fluid.

The use of the supplemental heat exchanger 200 permits an installer to design the system for average low and high ambient temperatures. Designing a geothermal heating/cooling system for the absolute minimum and maximum expected ambient temperatures increases the cost significantly. While the average daily low temperature in northern climates might be 20 degrees, the absolute minimum could be as low as minus 20 degrees. The present invention uses the supplemental heat exchanger 200 discussed above to control the temperature of the first fluid during extreme conditions.

In the embodiments discussed above, the system's capabilities for average winter/summer ambient conditions are discussed. In one embodiment, the "ON/OFF" cycle is modified by measuring the temperature of the water in the containment vessel and locking out the geothermal unit if the preset min/max temperatures is exceeded. The water in the containment vessel may also be replaced with new water (conditioned water that could be tap water) whenever the temperature limits are exceeded. The displaced water may be discharged into a storm sewer, lake, and/or pond.

Figure 6:
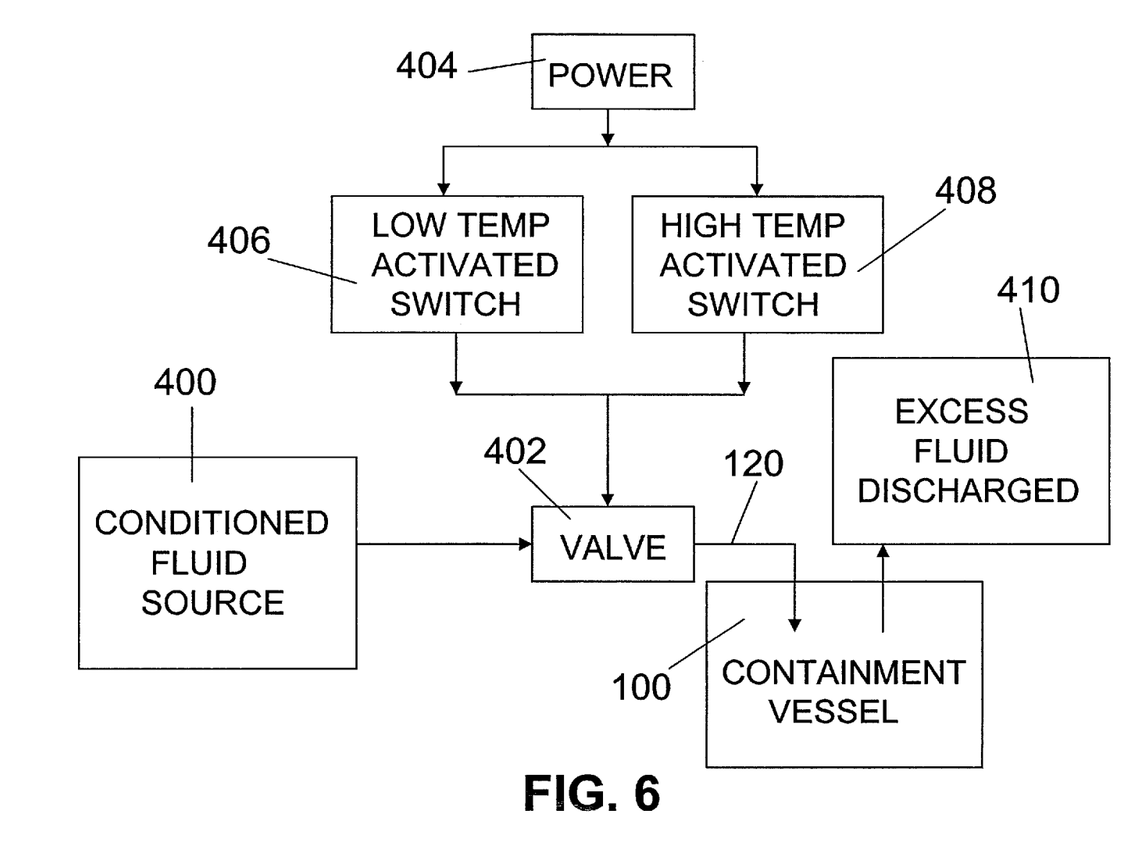
FIGS. 6-8 illustrate embodiments of the present invention in which an auxiliary water source is used to supply the first fluid to the containment vessel.
Figure 7:
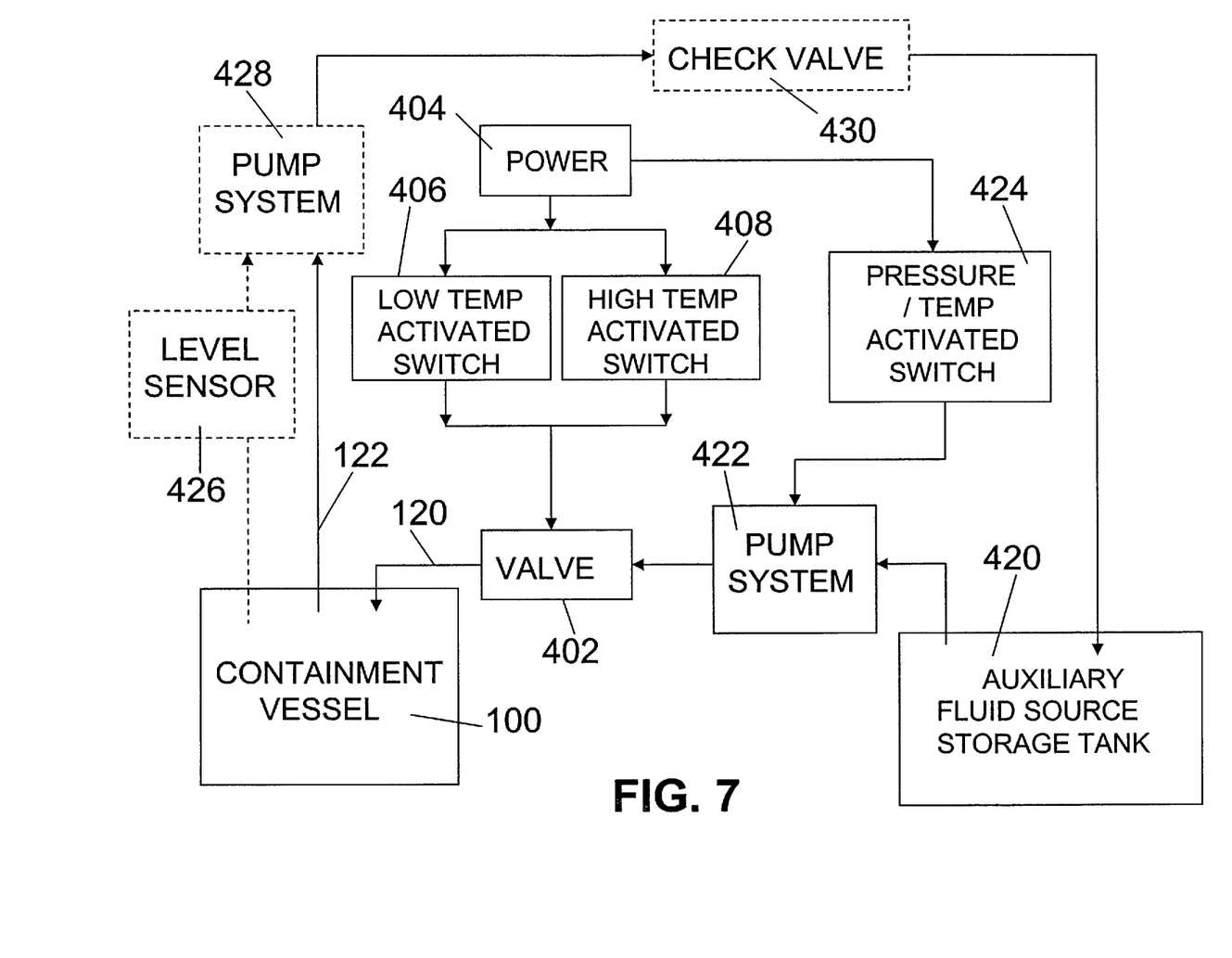
Figure 8:
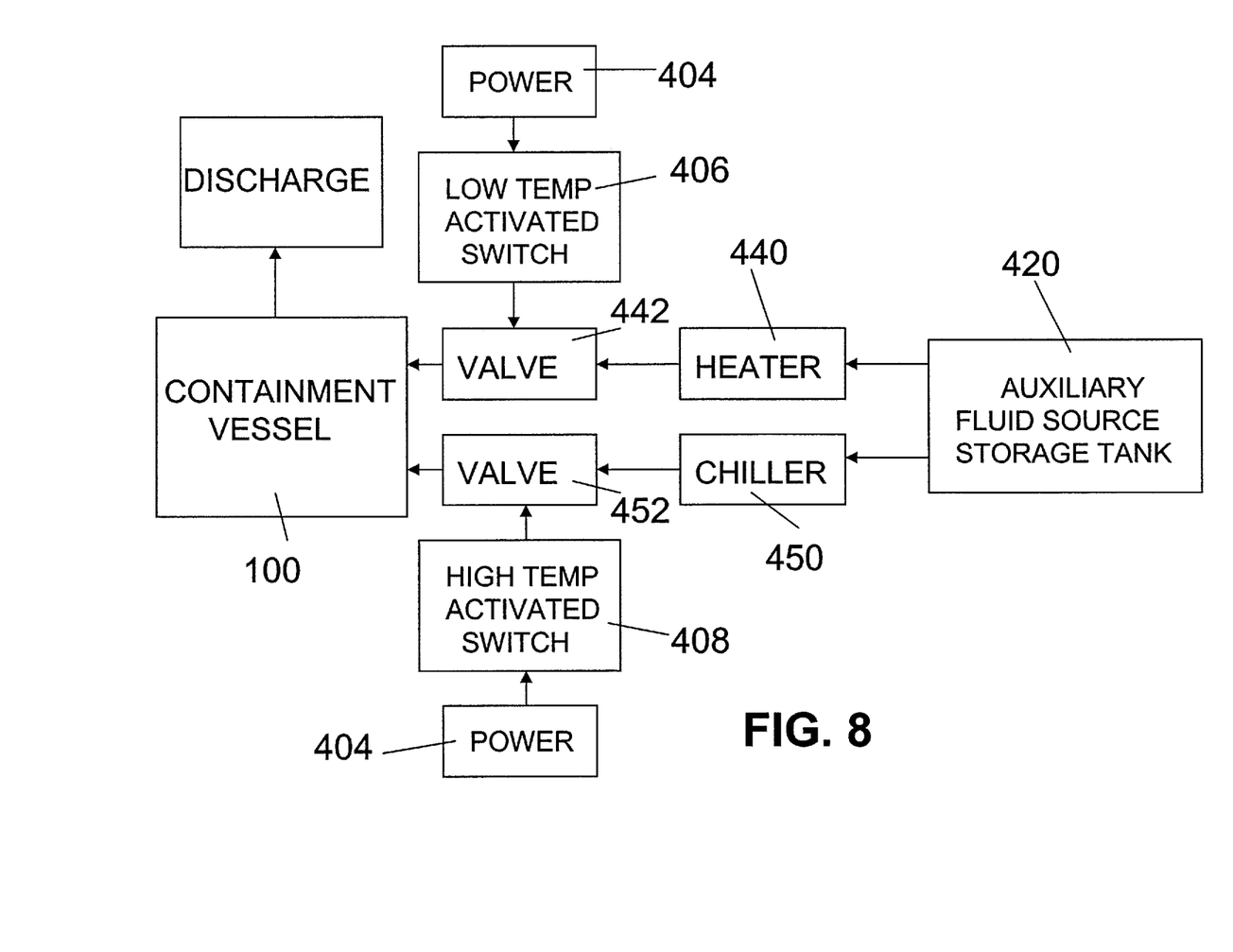

FIGS. 6-8 illustrate exemplary embodiments of the present invention which include auxiliary fluid supplies for selectively replacing the first fluid within the casing or containment vessel 100. In one illustrated embodiment shown in FIG. 6, a conditioned water source 400 is coupled to an inlet line 120 of containment vessel 100 by a valve 402. Conditioned water source 400 may be a tap water source or a tap water source which has been run through a water softener. A power supply 404 is coupled to valve 402 through a low temperature activated switch 406 and a high temperature activated switch 408. When switches 406 or 408 detect a temperature in containment vessel 100 lower than a preset value or higher than a preset value, respectively, valve 402 is opened to allow fluid from the conditioned water source 400 to enter the containment vessel 100 through inlet 120. Excess water from the containment vessel 100 is discharged as illustrated at block 410. Such discharge may be to a drain, storm sewer, pond, stream or other acceptable place. If the containment vessel 100 is not pressurized sufficiently, a pump and level detector may be used to remove the first fluid from the containment vessel 100, especially if the containment vessel is positioned lower than the discharge area.

FIG. 7 illustrates a closed loop auxiliary fluid source which eliminates discharging conditioned water. In this embodiment, an auxiliary fluid source storage tank 420 is provided. In one illustrated embodiment, a two thousand (2000) gallon concrete tank designed for septic systems may be used for the storage tank 420. This storage capacity is nearly 10 times the water in the containment vessel (illustratively the interior volume 102 of containment vessel 100). The storage tank is illustratively buried with its top at least three (3) feet underground. In colder climates, such as Minnesota, the tank would need to be buried deeper or additional dirt could be mounded on its top to keep the top of the tank below the frost line.

In the embodiment of FIG. 7, when either a low temperature set point or a high temperature set point is reached, low temperature activated switch 406 or high temperature activated switch 408, respectively, supply power from power supply 404 to open valve 402. This open valve 402 allows fluid from the auxiliary fluid source storage tank 420 to be pumped into the containment vessel 100 to replace a portion of the first fluid within the containment vessel 100 that is above or below the predetermined temperature limits. A pump 422 may be turned on and off by relay contacts controlled by the sensors 406, 408. The pump 422 may also be activated by a separate pressure or temperature activated switch 424. For instance, the pressure activated switch 424 could detect the opening of valve 402 and automatically begin pumping fluid from the storage tank 420 into the containment vessel 100.

Discharge fluid from the containment vessel 100 is illustratively returned to the auxiliary fluid source storage tank 420. If the containment vessel 100 is sealed both at the top and the bottom, delivery of the fluid by pump system 422 forces the excess first fluid in the containment vessel 100 from the containment vessel 100 to the storage tank 420 through outlet 122. If the top of the containment vessel 100 is not sealed, or if otherwise necessary, a level sensor 426 may be provided within the containment vessel 100. The level sensor can turn on a discharge pump to discharge the first fluid from the containment vessel 100 back to the storage tank 420. A check valve 430 may be provided in discharge line 122, if necessary, to ensure that the fluid flows only from the containment vessel 100 to the storage tank 420.

The recovery time to restore the water in the storage tank 420 to its normal temperature is much longer than that of the water in the containment vessel 100. This is a result of the differences in the heat transfer rates of steel and concrete, the significant difference in wall thickness of the two, the difference in surface area contact with the earth (tank=0.135 sq. ft./gal, pipe=1.282 sq. ft./gal) and the difference in depth at which they are buried. Other material options for storage tanks 420 would be the use of steel and fiberglass tanks such as those used in the storage of fuels. It is recognized that other suitable materials could also be used to fabricate the storage tank 420, if desired.

Another embodiment of the system adds means for heating the fluid as it is drawn from the storage tank 420. During the heating season, the refrigerant from the geothermal system is extracting heat from the water in the containment vessel. As the temperature of the ground is nominally 55° F., the system should typically allow the temperature of the water in the containment vessel to drop no more than 20° F. to prevent freezing. (Adding an anti-freeze solution, as mentioned previously, to prevent freezing negates the contaminant containment feature of the invention.) Therefore, because of the minimal allowed temperature spread, heating the water as it comes from the storage tank would enhance the system's ability to operate efficiently when the ambient outside temperatures reach extreme lows.

Yet another embodiment of the present invention is illustrated in FIG. 8. In a heating mode, the geothermal system extracts heat from the earth. The temperature of the earth a few feet below the surface is relatively constant at about 55° F. An earth/water/refrigerant heat exchanger when extracting heat from the water will cause the temperature of the water to drop. It is not desirable to allow the temperature of the water to drop to its freezing point typically stated at 32° F. Therefore, a low temperature set point within the containment vessel 100 may be, for example, about 35° F., thereby allowing a temperature change of about 20° F. of the first fluid.

In a cooling mode, the geothermal system moves heat to the earth. An earth/water/refrigerant heat exchanger when moving heat to the water will cause the temperature to rise. The upper temperature limit is not determined by water condition, but by the system refrigerant temperature as it exits the compressor. In a typical system, this temperature is about 140° F. As long as the temperature of the first fluid within the containment vessel 100 remains below 140° F., heat will be transferred from the refrigerant to the water. In one embodiment, the maximum temperature of the first fluid is set to be about 95° F.

To enhance the effect of introducing fluid from the auxiliary fluid source storage tank 420 to the containment vessel 100, means for heating and the cooling the water is added to the system as shown in FIG. 8. In the colder months, an in-line water heater 440 or standard water heater may be added between the auxiliary fluid source storage tank 420 and the containment vessel 100 as shown in FIG. 8 to heat to a temperature above its nominal 55° F. During the warmer months, a chiller 450 may be used to lower the temperature of the water in the containment vessel below its nominal 55° F. The use of heater 440 and chiller 450 permits a smaller storage tank 420 to be used. The capital cost savings of the smaller storage tank 420 should be balanced against the capital cost of the heater 440 and chiller 450 along with the respective costs of operation.

In FIG. 8, the first fluid from the storage tank 420 passes through heater 440 and a first valve 442 to containment vessel 100. The first fluid from storage tank 420 may also pass through chiller 450 and a second valve 452 to containment vessel 100. When a low temperature sensor switch 406 senses temperature of the first fluid in the containment vessel 100 below a preset limit, power 404 is supplied to open a valve 442 and allow warm water from heater 440 to flow to containment vessel 100. The first fluid already in the containment vessel 100 is discharged as discussed above. If high temperature switch 408 senses temperature of the first fluid within the containment vessel 100 above the preset maximum, valve 452 is opened and cooled water from chiller 450 flows to the containment vessel 100.

As discussed herein, features of the various illustrated embodiments of the invention include: 1. The containment of potential contaminants; 2. The ability of utilizing the full length of the containment vessel because it is sealed and can be filled to or near its top; 3. The ability of utilizing the mechanical stability fixtures to improve the heat transfer from the refrigerant lines to the water in the containment vessel; 4. The ability to control the heat transfer rate between the refrigerant and the water along the entire length of the containment vessel; 5. The ability to detect the limits of the earth/refrigerant heat exchanger and to modify the ON/OFF cycle of the geothermal system; and 6. The ability to add supplemental capacity to the earth/refrigerant heat exchanger without changing its basic operation.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A geothermal system for transferring heat between the earth and a target, the system comprising:
   a containment vessel having an interior volume defined by a wall, a first end, and a second end;
   a cap coupled to the first end of the containment vessel;
   a fluid supply line coupled to the containment vessel;
   a plug located adjacent the second end of the containment vessel and configured to contain contaminants released due to failure of a system component within the interior volume of the containment vessel;
   a valve coupled to the fluid supply line and a fluid source, the fluid source is an underground storage tank to hold the first fluid, the valve being selectively opened and closed to supply a first fluid to the interior volume of the containment vessel so that heat is transferred between the earth and the first fluid;
   an interior heat exchange line located in the interior volume of the containment vessel, the interior heat exchange line having an input line and a return line in fluid communication;
   a second fluid located in the interior heat exchange line to transfer heat between the first fluid and the target via circulating through the interior heat exchange line;
   a low temperature activated switch configured to open the valve in response to a temperature of the first fluid in the interior volume of the containment vessel dropping below a preset temperature;
   a high temperature activated switch configured to open the valve in response to the temperature of the first fluid in the interior volume of the containment vessel rising above a preset maximum value; and
   a first pump for selectively pumping the first fluid from the underground storage tank to the containment vessel when the valve is opened, wherein an outlet line from the containment vessel is coupled back to the storage tank so that the first fluid discharged from the containment vessel enters the storage tank.

2. The system of claim 1, further comprising at least one support fin to support the input line and the return line within the containment vessel, each support fin being formed to include an input line orifice and a return line orifice, whereby the input line passes through the input line orifice and the return line passes through the return line orifice.

3. The system of claim 2, wherein the at least one support fin has at least one additional orifice to permit the first fluid to pass through the at least one support fin.

4. The system of claim 1, wherein the plug comprises one of concrete, compacted clay, or a plate coupled to the wall.

5. The system of claim 1, wherein the outlet line is in communication with the interior volume of the containment vessel for removing the first fluid from the containment vessel when fluid from the fluid source is added.

6. The system of claim 1, further comprising a check valve coupled to the outlet line to prevent the first fluid from flowing from the storage tank to the containment vessel through the outlet line.

7. The system of claim 1, further comprising a second pump coupled to the outlet line and a level sensor located in the interior volume of the containment vessel, the level sensor activating the second pump when the first fluid level rises to a predetermined level in the interior volume of the containment vessel.

8. The system of claim 1, further comprising a supplemental heat exchanger including means for heating and/or chilling the first fluid; a controller connected to the means for heating and/or chilling the first fluid and configured to circulate heated and/or chilled first fluid through the interior volume of the containment vessel; and a temperature sensor located in the interior volume of the containment vessel to measure a temperature of the first fluid, the temperature sensor being coupled to the controller.

* * * * *